UNITED STATES PATENT OFFICE 2,031,585

METHOD OF PRODUCING LIGHT WEIGHT PLASTERS

John C. Best and Frank Lee Marsh, Medicine Lodge, Kans., assignors to The Best Brothers Keene's Cement Company, Medicine Lodge, Kans., a corporation of Kansas No Drawing. Application September 18, 1933, Serial No. 689,957

6 Claims. (Cl. 106—34)

Our invention relates to a method of producing light weight plasters having advantages over plasters now in use, and better adapting the material for use as a wall plaster, for casting in various types of molds, for surgical bandages, as an insulator against sound, heat or cold and as an acoustical material.

In the manufacture of plaster of this character, the dihydrate gypsum rock crushed or ground to desired fineness is calcined at a temperature suitable for the production of the grade of plaster desired, cooled and reground to proper particle size for ultimate use, and an agent for accelerating set of the plaster added if desired, all in accordance with ordinary practice.

It is known that a material of fine particle size can be obtained by calcining gypsum rock at a temperature and rate of through-put of the kiln to convert the dihydrate to a hemihydrate, mixing the hemihydrate with water in considerable excess over the amount needed to attain normal consistency and agitating the mixture during what would ordinarily be the setting period until the plaster has reverted to dihydrate of gypsum in very fine crystalline form.

For example, if a plaster is originally ground to a fineness at which approximately 80% of the material passes through a 100-mesh screen, and has a water ratio at normal consistency of approximately 50 to 60 cubic centimeters of water to 100 grams of plaster, when it is agitated through what would ordinarily be the setting period, the resulting dihydrate will be of a fineness to pass up to a 500-mesh screen, and will require as high as 800 cubic centimeters of water to 100 grams of the plaster to attain normal consistency.

Mixing the plaster through the set has been found to be particularly advantageous with plasters having fairly short setting times, say from 15 minutes down, and it is customary to add the water to the plaster gradually as the mixture begins to stiffen under the process of agitation, because, if the setting time of the plaster is too slow or too much water is added in the beginning, the material will either not recrystallize in the light weight form or the production of light weight material will be only partial.

By adding an accelerator of some kind to the plaster, a wider range of original setting time in the plaster is permissible, and the full amount of the mixing water can generally be added at the beginning of the process, thus simplifying it considerably. It has been customary to use some form of aluminum sulphate or other alum for this purpose, but such chemicals have the disadvantage that they remain in the mixed material after it is subsequently calcined, and thus serve as an accelerator when the calcined material is again used for plaster.

We have discovered, however, that by recalcining the plaster of ordinary fine grade produced according to the ordinary methods, such as that described above, after the material has been mixed through the set at a temperature and rate of through-put to again form a hemihydrate we are able to produce a still finer material which can be cast or molded to produce articles of extremely light weight having the appearance of a solid object, due to comparatively small voids between the particles.

We have also discovered that an acid, that will be decomposed by subsequent calcination, when employed as an accelerator, will be largely taken up by neutralization with any alkali in the gypsum or by chemical combination with any carbonate therein to form a calcium salt, and that any small residue of such acid which may be left in the mixture is driven off in subsequent recalcination of the product. We have found that sulphuric acid is particularly adapted for use as such an accelerator and prefer to use such acid in the practice of our process.

It is, therefore, the object of our invention to provide the method herein described for production of finer or lighter plaster which, when cast or molded, used on a wall, or for other purposes, will have greater bulk but lighter weight than plasters produced according to ordinary methods.

In practicing our method we reduce the dihydrate gypsum rock to proper particle size for calcination, calcine the reduced rock at a temperature and rate of through-put to convert the dihydrate to the hemihydrate suitable for use as a plaster, mix the calcined product through what would ordinarily be the setting period with water in excess of that required to attain normal consistency to reconvert the product to the dihydrate and preferably adding an accelerator, such as sulphuric acid, for hastening the setting time of the ultimate product.

After the material has reverted to a very fine crystalline form of the dihydrate by continuous agitation through the setting period, we then recalcine the finely recrystallized gypsum product at a temperature ordinarily employed for the manufacture of white plaster, to thereby again form the hemihydrate and produce a plaster product lighter, fluffier and bulkier than that heretofore produced by ordinary methods.

Cast or molded articles made from plaster produced from our improved method will be bulkier and lighter in weight than those produced from ordinary methods, and, while not having the strength of objects made from ordinary plaster, have been found to have a tensile strength of approximately 125 pounds to the square inch, the finished product having a solid appearance, due to the fineness of the actual particles and of the pores formed by drying of the finished article.

What we claim and desire to secure by Letters Patent is:

1. The method of producing light weight plaster including calcining gypsum at a temperature to produce a hemihydrate plaster, mixing the plaster with water, agitating the mixture until the plaster has recrystallized as a dihydrate in finer particle size, and calcining the dihydrate at a temperature to produce a hemihydrate.

2. The method of producing light weight plaster including producing a hemihydrate plaster by calcining gypsum, mixing the plaster with water in excess of that required for hydration, agitating the mixture until the plaster has reverted to dihydrate of gypsum in fine crystalline form, and recalcining the plaster at a temperature under that required for rendering the final product anhydrous.

3. The method of producing light weight plaster including calcining dihydrate gypsum at a temperature of approximately 360° F. to form a hemihydrate plaster, mixing the plaster with water, agitating the mixture until the plaster has reverted to dihydrate of finer particle size than that of the original product, and recalcining the dihydrate at approximately 360° F. to produce a hemihydrate.

4. The method of producing light weight plaster including calcining crushed or ground gypsum rock, mixing the calcined material with water, adding an accelerating agent to the mixture, agitating the wet mixture until it has recrystallized in a finer particle size, and recalcining the material.

5. The method of producing light weight plaster including calcining crushed or ground gypsum rock, mixing the calcined material with water, adding to the mixture an accelerating agent that will decompose or become volatilized during recalcination of the mixture, agitating the wet mixture until it has recrystallized in a finer particle size, and recalcining the material.

6. The method of producing light weight plaster including calcining crushed or ground gypsum rock, mixing the calcined material with water, adding sulphuric acid to the mixture as an accelerating agent, agitating the wet mixture until it has recrystallized in a finer particle size, and recalcining the material.

JOHN C. BEST.
FRANK LEE MARSH.

DISCLAIMER 2,031,585.—*John C. Best* and *Frank Lee Marsh*, Medicine Lodge, Kans. METHOD OF PRODUCING LIGHT WEIGHT PLASTERS. Patent dated February 25, 1936. Disclaimer filed February 21, 1939, by the assignee, *National Gypsum Company*.

Hereby enters this disclaimer to claims 2, 4, and 5 in said specification.

[*Official Gazette March 21, 1939.*]